US012231011B2

(12) United States Patent
Moya (10) Patent No.: US 12,231,011 B2
(45) Date of Patent: Feb. 18, 2025

(54) ROTARY ELECTRIC MACHINE STATOR WITH SIMPLIFIED WINDING

(71) Applicant: NIDEC PSA EMOTORS, Carrieres sous Poissy (FR)

(72) Inventor: Cyril Moya, Chatou (FR)

(73) Assignee: NIDEC PSA EMOTORS, Poissy (FR)

( * ) Notice: Subject to any disclaimer, the term of this patent is extended or adjusted under 35 U.S.C. 154(b) by 378 days.

(21) Appl. No.: 17/626,367

(22) PCT Filed: Jul. 21, 2020

(86) PCT No.: PCT/FR2020/051314
§ 371 (c)(1),
(2) Date: Jan. 11, 2022

(87) PCT Pub. No.: WO2021/019152
PCT Pub. Date: Feb. 4, 2021

(65) Prior Publication Data
US 2022/0263365 A1    Aug. 18, 2022

(30) Foreign Application Priority Data

Jul. 29, 2019    (FR) ........................ 1908622

(51) Int. Cl.
*H02K 3/28* (2006.01)
*H02K 1/16* (2006.01)
*H02K 3/12* (2006.01)

(52) U.S. Cl.
CPC .............. *H02K 3/28* (2013.01); *H02K 1/16* (2013.01); *H02K 3/12* (2013.01)

(58) Field of Classification Search
USPC .......................................... 335/207
See application file for complete search history.

(56) References Cited

U.S. PATENT DOCUMENTS

| 2005/0248229 A1* | 11/2005 | Even ........................ H02K 3/28 |
| | | 310/201 |
| 2007/0182267 A1* | 8/2007 | Neet ....................... H02K 1/165 |
| | | 310/180 |
| 2021/0408855 A1* | 12/2021 | Islam ................... H02K 1/2766 |

FOREIGN PATENT DOCUMENTS

| EP | 1220419 A2 | 7/2002 |
| FR | 2868620 A1 | 10/2005 |

(Continued)

OTHER PUBLICATIONS

International Search Report for PCT/FR2020/051314 mailed Oct. 22, 2020.
Written Opinion for PCT/FR2020/051314 mailed Oct. 22, 2020.

*Primary Examiner* — Bernard Rojas
(74) *Attorney, Agent, or Firm* — Jonathan P. Soifer; Sandberg Phoenix & von Gontard, PC (57) ABSTRACT

Stator (2) for a rotary electric machine (1), comprising a stator mass (25) comprising slots (21), electrical conductors (22) accommodated in the slots (21) forming a multiphase winding having at least a first phase (a) and a second phase (b), an input electrical conductor (A) of the first phase (a) being located in a first slot (slot number 1), one or more electrical conductors of the second phase (b) being located in a second slot (slot number 2), the second slot immediately following the first slot when going circumferentially around the axis of rotation of the machine, in the direction of flow of the electric current around the axis of rotation of the machine.

14 Claims, 9 Drawing Sheets

(56) References Cited

FOREIGN PATENT DOCUMENTS

| WO | 2012004817 | A1 | 1/2012 |
|----|------------|----|--------|
| WO | 2016139430 | A1 | 9/2016 |

* cited by examiner

ROTARY ELECTRIC MACHINE STATOR WITH SIMPLIFIED WINDING

CROSS-REFERENCE TO RELATED APPLICATIONS

This application is the US National Stage under 35 USC § 371 of International Application No. PCT/FR2020/051314, filed 21 Jul. 2020 which claims the priority of French application 1908622 filed on Jul. 29, 2019, the content of both (text, drawings and claims) being incorporated here by reference.

BACKGROUND

The present invention relates to rotary electric machines, and more particularly to the stators of such machines.

The invention relates more particularly to synchronous or asynchronous AC machines. It relates in particular to traction or propulsion machines for electric motor vehicles (Battery Electric Vehicle) and/or hybrid motor vehicles (Hybrid Electric Vehicle-Plug-in Hybrid Electric Vehicle), such as individual cars, vans, trucks or buses. The invention also applies to rotary electric machines for industrial and/or energy production applications, in particular naval, aeronautical or wind power applications.

There is a need to benefit from a stator for a rotary electric machine that is easy to assemble allowing efficient filling of the slots, while ensuring satisfactory electromagnetic performance.

There is also a need to reduce the cost of manufacturing electric machines, in particular by simplifying the winding of the stator, for example by minimizing the number of parts to be used.

There is also a need to further improve the stators of electric machines, and in particular to reduce torque ripples and Joule AC losses by induced currents, electromagnetic vibrations, and noise.

SUMMARY

Stator

The above-noted needs are met, in part by the disclosed stator for a rotary electric machine. In accordance with one of its aspects, the stator comprises a stator mass comprising slots, electrical conductors accommodated in the slots forming a multiphase winding having at least a first phase and a second phase, an input electrical conductor of the first phase being located in a first slot, one or more electrical conductors of the second phase being located in a second slot, the second slot immediately following the first slot when going circumferentially around the axis of rotation of the machine, in the direction of flow of the electric current around the axis of rotation of the machine, the winding in particular comprising U-shaped pins with a width of n slots and U-shaped pins with a width of n−1 slots.

The input electrical conductor of the first phase is located in a first slot just before a second slot receiving one or more electrical conductors of the second phase, when moving circumferentially around the axis of rotation of the machine, in the direction of flow of the electric current around the axis of rotation of the machine.

Thus, the input electrical conductor of the first phase is located opposite the usual position, namely a position in which the first slot receiving the input electrical conductor of the first phase is immediately followed by a second slot receiving one or more electrical conductors of the same first phase, when moving circumferentially around the axis of rotation of the machine, in the direction of flow of the electric current around the axis of rotation of the machine. The input slot of a first phase is followed by a slot housing electrical conductors of a second phase different from the first.

Thus, the number of slots between the input electrical conductor and the output electrical conductor of the same phase is reduced. The first input slot of a phase can be brought closer to a third output slot of this same phase. In other words, the number of slots separating the first input slot of a phase and the third output slot of the same phase can be smaller. Thus, this stator makes it possible to reduce the tooth pitch of the electrical conductors that serve to connect the various winding paths, which progress in the same direction around the axis of rotation of the machine, and the average length of each phase owing to a better nesting of the sub-assemblies of electrical conductors constituting the winding, measured circumferentially around the axis of rotation of the machine. Shortening the average length of a phase improves linear resistance and thermal performance, and reduces the mass of copper required.

Implementing this stator also makes it possible to obtain shorter coil heads for the electrical conductors on the side opposite the welds. The quantity of copper necessary to manufacture the conductors is therefore reduced, which is economically advantageous. In addition, the insertion of the electrical conductors in the slots can be facilitated.

Furthermore, an electrical output conductor of the first phase may be located in a first slot, one or more electrical conductors of the second phase being located in a second slot, the second slot immediately following the first slot when moving circumferentially around the axis of rotation of the machine, in the direction of flow of the electric current around the axis of rotation of the machine. The output electrical conductor of the first phase is located in a first slot just before a second slot receiving one or more electrical conductors of the second phase, when moving circumferentially around the axis of rotation of the machine, in the direction of flow of the electric current around the axis of rotation of the machine.

Thus, the output electrical conductor of the first phase is located opposite the usual position, namely a position in which the first slot receiving the output electrical conductor of the first phase is immediately followed by a second slot receiving one or more electrical conductors of the same first phase, when moving circumferentially around the axis of rotation of the machine, in the direction of flow of the electric current around the axis of rotation of the machine. The output slot of a first phase is followed by a slot housing electrical conductors of a second phase different from the first.

The phase inputs can be offset by an angle of 30°, 60°, 90 or by an angle of 120°, for example.

The electrical conductors can form a distributed winding.

The winding can form a single star or single delta circuit. It may in particular not form a double star circuit connected in delta.

Pins

At least some electrical conductors, if not a majority of the electrical conductors, can be in the form of U- or I-pins. The pin can be U-shaped ("U-pin") or straight, being I-shaped ("I-pin").

The pin and flat electrical conductors increase the filling coefficient of the slot, making the machine more compact. Owing to a high filling coefficient, the thermal exchanges between the electrical conductors and the stator mass are improved, which makes it possible to reduce the temperature of the electrical conductors inside the slots.

Furthermore, the manufacture of the stator can be facilitated by the electrical conductors in pin form. Finally, since the pins do not need to have open slots, it is possible to have closed slots that make it possible to hold the pins, and it is therefore possible to eliminate the step of inserting stator shims.

Some electrical conductors, or even a majority of electrical conductors, extend axially in the slots. The electrical conductors can be introduced into the corresponding slots by one or both axial ends of the machine.

An I-shaped electrical conductor has two axial ends each placed at one of the axial ends of the stator. It passes through a single slot, and can be welded at each of its axial ends to two other electrical conductors, at the axial ends of the stator. The stator may for example comprise 6, 10, 12, 14, 18, 22 or 26 electrical conductors in the shape of an I, the other electrical conductors possibly all being in the shape of a U.

A U-shaped electrical conductor has two axial ends both placed at one of the axial ends of the stator. These two axial ends are defined by the two legs of the U. It passes through two different slots, and can be welded at each of its axial ends to two other electrical conductors, at the same axial side of the stator. The bottom of the U, that is to say, the side of the U forming the coil or coil head, is placed on the other axial side of the stator.

At least some of the electrical conductors, if not a majority of the electrical conductors, can be in the form of U-pins.

In addition, the size of the electrical conductors at the coil heads is reduced. This facilitates the nesting of the electrical conductors.

In addition, at least some of the electrical conductors may be in the shape of a pin, in particular an I-pin, extending axially in the slots. The I-shaped pins can in particular form the electrical input and output conductors of each of the phases. The winding can for example comprise 6 I-pins.

In addition, at least some of the electrical conductors may be in the form of a wide pin, called a "belt," making it possible to connect two winding paths which progress in opposite directions circumferentially around the axis of rotation of the machine. In one phase, there can be 5 winding paths, for example three in one direction and two in the other direction. As a variant, in one phase there may be 7 winding paths, for example four in one direction and three in the other direction. A belt is a U-shaped pin whose two legs have the same radial position in the slots, that is to say, which do not change stages in the two slots.

The winding can comprise one belt per phase. In one embodiment, the winding comprises three belts. A belt can have a larger width, that is to say, the number of slots it covers, because the return is shortened.

In one embodiment, all the belts of the winding can be located on the same stage. The winding may not comprise a belt arranged on two different stages.

At least some of the electrical conductors, if not a majority of the electrical conductors, can be in the form of U-pins, with U-pins of a first width and U-pins of a second width.

The winding may be devoid of a U-pin of a third width different from the first and second widths. In some embodiments of the prior art, there are U-pins of at least three different widths. In the prior art, there are no U-pins of a first width and U-pins of a second width without U-pins of a third width different from the first and second widths. The width of a U-pin is equal to the number of tooth pitches+1.

Thus, the number of parts necessary to manufacture the stator can be reduced. This facilitates the procurement, adjustments and necessary tools and facilitates maintenance.

A U-pin has first and second legs that extend axially in first and second slots, respectively. The width of a U-pin is defined by the number of slots separating the first and second legs of the U-pin, including the two slots accommodating the two legs of the U-pin in question. The first and second legs can be separated by a number of slots between 3 and 20, better still between 6 and 16, for example 6, 7, 8, 9, or 10 or 11 slots.

In one embodiment, the winding may comprise U-pins with a width of N slots and U-pins with a width of N−1 slots.

It is thus possible to improve the nesting of the pins of the winding. The winding can be compacted better, owing to a smaller variety of pins. Furthermore, the number of tools necessary to manufacture the pins, and thus the useful floorspace required, as well as maintenance are limited.

The winding can be devoid of U-pins with a width of N+1 slots. A slot adjacent to a first slot accommodating input or output electrical conductors or a belt may accommodate only U-pins with a width of N or N−1 slots. A belt may have a width of N−1 slots. Thus, the U-pins and the adjacent belt can thus have the same width, which makes it possible to promote their juxtaposition to avoid a gap between them. They can thus have the same inclination relative to a plane normal to the longitudinal axis of the machine. The insertion of the electrical conductors is improved, and the stresses internal to the electrical conductors are reduced.

In one embodiment, the winding may have U-pins that are 12 slots wide and U-pins that are 11 slots wide. The winding can be devoid of U-pins that are 13 slots wide. A slot adjacent to a first slot accommodating input or output electrical conductors or a belt may accommodate only U-pins that are 11 or 12 slots wide.

In the case where the winding has 63 slots, the coil may for example comprise 42 U-pins with a width of 12 slots and 15 U-pins with a width of 11 slots.

In one embodiment, the winding may comprise U-pins that are 10 slots wide and U-pins that are 9 slots wide. The winding can be devoid of U-pins with a width of 11 slots. A slot adjacent to a first slot accommodating input or output electrical conductors or a belt may accommodate only U-pins that are 9 or 10 slots wide.

In the case where the winding has 72 slots and 8 poles, the coil may for example comprise 54 U-pins with a width of 10 slots and 12 U-pins with a width of 9 slots.

In one embodiment, the winding may comprise U-pins that are 7 slots wide and U-pins that are 8 slots wide. The winding can be devoid of U-pins with a width of 9 slots. A slot adjacent to a first slot accommodating input or output electrical conductors or a belt may accommodate only U-pins that are 7 or 8 slots wide.

In the case where the winding has 48 slots, the coil may for example comprise 36 U-pins with a width of 8 slots and 26 U-pins with a width of 7 slots.

In one embodiment, the winding may comprise U-pins that are 8 slots wide and U-pins that are 9 slots wide. The winding can be devoid of U-pins with a width of 7 slots. A slot adjacent to a first slot accommodating input or output electrical conductors or a belt may accommodate only U-pins that are 8 or 9 slots wide.

In the case where the winding has 60 slots, the coil may for example comprise 45 U-pins with a width of 9 slots and 9 U-pins with a width of 8 slots.

The second slot can comprise one or more electrical conductors of the same phase only.

The first input slot of a first phase may comprise one or more electrical conductors of the first phase only.

As a variant, the first input slot of a first phase may comprise one or more electrical conductors of the first phase and one or more electrical conductors of the second phase. The electrical conductor(s) of the first phase can be placed on the side of the yoke or alternatively on the side of the air gap. The electrical conductor(s) of the second phase can be placed on the side of the air gap or, as a variant, on the side of the yoke. The phase inputs and outputs can be placed on the yoke side or alternatively on the air gap side.

Strands

Each electrical conductor may comprise one or more strands (also called "wire"). "Strand" refers to the most basic unit for electrical conduction. A strand can be of round cross-section, which may then be called "wire," or may be flat. The flat strands can be shaped into pins, for example U- or I-pins. Each strand is coated with an insulating enamel.

The fact that each slot can comprise several conductors and/or several strands makes it possible to minimize losses by induced currents, or Joule AC losses, which vary with the square of the supply frequency, which is particularly advantageous at high frequency and when the operating speed is high. The heat transfer to the cold source is also facilitated. It is thus possible to obtain better efficiency at high speed.

When the slots are closed, it is possible to obtain a reduction in the leakage fluxes seen by the conductors, which leads to a reduction in eddy current losses in the strands.

In one embodiment, each electrical conductor may comprise several pins, each forming a strand, as explained above. All the strands of the same electrical conductor can be electrically connected to each other at the outlet of the slot. The strands electrically connected to each other are placed in short circuit. The number of strands electrically connected together may be greater than or equal to 2, being for example between 2 and 12, being for example 3, 4, 6 or 8 strands.

Several strands can form the same electrical conductor. The same electric current of the same phase circulates in all the strands of the same electrical conductor. All the strands of the same electrical conductor can be electrically connected to each other, in particular at the outlet of the slot. All the strands of the same electrical conductor can be electrically connected to each other at each of their two axial ends, in particular at the outlet of the slot. They can be electrically connected in parallel.

All the strands of all the electrical conductors having a free end located at the same circumferential position about the axis of rotation of the machine, regardless of their radial position, can be electrically connected to one another.

In one embodiment, each electrical conductor comprises a single strand. In another embodiment, each electrical conductor comprises three strands.

In the case where a slot comprises two electrical conductors, a slot can therefore house two strands, or in a variant six strands, for example, distributed between the two electrical conductors.

In a variant, a slot comprises four electrical conductors. Each electrical conductor can comprise two strands. The slot then houses eight strands, distributed between the four electrical conductors.

The strands can be positioned in the slot so that their circumferential dimension around the axis of rotation of the machine is greater than their radial dimension. Such a configuration allows a reduction in eddy current losses in the strands.

A strand may have a width of between 1 and 5 mm, for example of the order of 2.5 or 3 mm. The width of a strand is defined as its dimension in the circumferential direction about the axis of rotation of the machine.

A strand may have a height of between 1 and 5 mm, for example of the order of 1.6 or 1.8 mm. The height of a strand is defined as its thickness in the radial dimension.

The electrical conductors can be made of copper or aluminum.

Winding

A winding is made up of a number m of phases offset in space in such a way that when supplied by a multi-phase current system, they produce a rotating field.

The electrical conductors can form a single winding, in particular with full or fractional pitch. "Single winding" means that the electrical conductors are electrically connected together in the stator, and that the connections between the phases are made in the stator, and not outside the stator, for example in a terminal box.

The electrical conductors can form a distributed winding. The winding is not concentrated or wound on a tooth.

The winding can be with full pitch. Each slot only accommodates electrical conductors of the same phase and/or the width of an electrical conductor is equal to the number of slots divided by the number of poles.

As a variant, the winding can be with shortened pitch. Slots can accommodate electrical conductors of different phases. In one embodiment, at least one slot accommodates an electrical conductor of the first phase and an electrical conductor of the second phase and/or the width of the majority of the electrical conductors is less than the number of slots divided by the number of poles.

The winding is whole or fractional. The winding can be whole in pitch with or without shortening, or fractional in a variant. In one embodiment, the electrical conductors form a fractional winding.

For a fractional winding, the number of slots per pole and per phase is fractional, i.e. the ratio q, defined by $q=Ne/(2pm)$, is written as an irreducible fraction $z/n$, $z$ and $n$ being two non-zero integers, $n$ being different from 1, where $Ne$ is the number of slots of the stator, $m$ the number of phases of the winding, and $p$ the number of pairs of stator poles.

The number of slots in the stator can be between 18 and 96, better still between 30 and 84, being for example 18, 24, 27, 30, 36, 42, 45, 48, 54, 60, 63, 72, 78, 81, 92, 96 or even more preferably being 60 or 63. The number of poles of the stator can be between 2 and 24, or even between 4 and 12, for example 6 or 8.

The combination of number of slots/number of stator poles can be chosen from the combinations of the following list, which is not exhaustive: 30/4, 42/4, 45/6, 48/8, 63/6, 60/8, 78/8, 84/8.

In one embodiment, the ratio of number of slots/number of stator poles is 60/8. In this case we have $q=60/(2*4*3)=5/2$.

In one embodiment, the ratio of number of slots/number of pairs of stator poles is 63/6 or In this case we have $q=63/(2*3*3)=7/2$.

More broadly, the ratio between the number of slots Ne and the number of pairs of stator poles p may be one of those checked in the two-part table below, for a three-phase winding.

TABLE 1

| P | 3 | 6 | 9 | 12 | 15 | 18 | 21 | 24 | 27 | 30 | 33 | 36 | 39 | 42 | 45 | 48 | 51 | 54 | 57 | 60 | 63 | 66 | 69 | 72 | 75 | 78 | 81 | 84 | 87 | 90 |
|---|---|---|---|---|---|---|---|---|---|---|---|---|---|---|---|---|---|---|---|---|---|---|---|---|---|---|---|---|---|---|
| 1 | X |   | X |   | X |   | X |   | X |   | X |   | X |   | X |   | X |   | X |   | X |   | X |   | X |   | X |   | X |   |
| 2 |   | X | X |   | X | X | X |   | X | X | X |   | X | X | X |   | X | X | X |   | X | X | X |   | X | X | X |   | X | X |
| 3 |   |   | X |   |   |   |   |   | X |   |   |   |   |   | X |   |   |   |   |   | X |   |   |   |   |   | X |   |   |   |
| 4 |   |   | X | X | X | X | X |   | X | X | X | X | X | X | X |   | X | X | X | X | X | X | X |   | X | X | X | X | X | X |
| 5 |   |   |   | X | X | X | X | X | X |   | X | X | X | X | X | X | X | X | X |   | X | X | X | X | X | X | X | X |   |   |
| 6 |   |   |   |   |   | X |   |   | X |   |   |   |   |   | X |   |   | X |   | X |   |   |   |   |   |   | X |   |   | X |
| 7 |   |   |   |   | X | X | X | X | X | X | X | X | X |   | X | X | X | X | X | X | X | X | X | X | X | X |   | X | X | X |
| 8 |   |   |   |   |   | X | X | X | X | X | X | X | X | X | X | X | X | X | X | X | X | X | X | X | X | X | X | X | X | X |
| 9 |   |   |   |   |   |   |   |   | X |   |   |   |   |   |   |   |   | X |   |   |   |   |   |   |   |   | X |   |   |   |
| 10 |  |   |   |   |   |   | X | X | X | X | X | X | X | X | X | X | X | X | X |   | X | X | X | X | X | X | X | X | X | X |
| 11 |  |   |   |   |   |   |   | X | X | X | X | X | X | X | X | X | X | X | X | X | X |   | X | X | X | X | X | X | X | X |

The number of phases is three in this case, but it does not depart from the scope of the present invention if the number of phases is different, for example two, the machine then comprising a two-phase winding, or for example 5, 6, 7, 9, 11 or 13. The winding is polyphase.

The winding can be wavy. The electrical conductors can be placed in series in a so-called wave winding. The term "wave winding" is understood to mean a winding in which the electrical conductors of the same phase and of the same pole are electrically connected to one another so that, for a winding path, the electric current of the phase circulates in the electrical conductors rotating about the axis of rotation of the machine, always in one direction. For a winding path, the electrical conductors of the same phase and the same pole do not overlap when observed perpendicular to the axis of rotation of the machine.

The winding may comprise a single winding path or several winding paths. The current of the same phase flows by winding path in an "electrical conductor." "Winding path" means all the electrical conductors of the machine which are traversed by the same electric current of the same phase. These electrical conductors can be connected to each other in series or in parallel or in series-parallel. In the case where there is only one path, the electrical conductors are connected in series. In the case where there are several paths, the electrical conductors of each channel are connected in series, and the paths are connected in parallel.

Electrical Conductors

The current of the same phase of a winding path flows in an "electrical conductor." Several conductors in series form a "coil." The number of coils per phase is at most equal to the number of poles of the stator or to the number of pairs of poles.

In each slot there can be one or more layers. "Layer" refers to the series conductors belonging to the same phase arranged in the same slot. In each layer of a slot, there are the electrical conductors of the same phase. In general, the electrical conductors of a stator can be distributed in one layer or in two layers. When the electrical conductors are distributed in a single layer, each slot only houses electrical conductors of the same phase.

The electrical conductors can be divided into only two layers. In this case, one or more slots can house electrical conductors of two different phases. This is always the case for a winding with shortened pitch. In one embodiment, the winding may not comprise more than two layers. In one embodiment, it is notably devoid of four layers.

At least a first electrical conductor housed in a first slot can be electrically connected to a second electrical conductor housed in a second slot, at the outlet from said slots.

"Electrically connected" means any type of electrical connection, in particular by welding, with different possible welding methods, in particular laser, induction, friction, ultrasound, vibrations or brazing, or by mechanical clamping, in particular by crimping, screwing or riveting for example. The welding step can be carried out by means of a heat source, in particular a laser or an electric arc, for example an electric arc produced by means of a tungsten electrode. The welding method using a tungsten electrode can be TIG ("Tungsten Inert Gas") welding. In this welding method, the electric arc is produced from a tungsten electrode and a plasma. Using a heat source allows the free ends of the strands to be melted without damaging the assembly of the strands of the conductor(s). A single heat source can be used to produce the same weld. As a variant, several heat sources can be used to produce the same weld.

Electrical conductors housed in a first slot can each be electrically connected to a respective second electrical conductor housed in a second slot, at the outlet of said slots. At least one slot, better still a majority of the slots, or even more than half of the slots, better still more than two-thirds of the slots, or even all of the slots, may comprise first electrical conductors each electrically connected to a respective second electrical conductor housed in a second slot, at the outlet of said slots.

The first and second electrical conductors can be electrically connected to the output of the slots, that is to say, the electrical connection is formed on the electrical conductors just after they leave the two slots, at an axial end of the stator mass. The electrical connection can be made in a plane perpendicular to the axis of rotation of the machine. The plane of the electrical connection can be less than 60 mm away from the stator mass, better still less than 40 mm away, for example approximately 27 mm or 38 mm.

In one embodiment, all the electrical conductors having a free end located at the same circumferential position about the axis of rotation of the machine, regardless of their radial position, are electrically connected together.

The first and second electrical conductors can each comprise an oblique portion. The oblique portions may extend in a circumferential direction about the axis of rotation of the machine. The two oblique portions can be configured to converge toward one another and thus allow the electrical connection to be made.

An electrical conductor can comprise two oblique portions, one at each of its two ends. The two oblique portions of the same electrical conductor can extend in opposite directions. They can diverge from each other. They can be symmetrical with respect to each other.

A majority of the electrical conductors can comprise one or more oblique portions as described above.

The electrical connection between two electrical conductors can be provided on a second side of the stator opposite a first side of the stator where the phase inputs and outputs and/or the coil heads are arranged.

On the side of the coil heads, the coil heads of the same phase can be grouped into groups of m or m+1 adjacent electrical conductors. The coil heads of the same phase may not be grouped into groups of less than m or m+1 adjacent electrical conductors. In particular, the coil heads of the same phase may not be grouped into groups of m−1 adjacent electrical conductors only. Two groups of coil heads of the same phase can be separated by at least one group of coil heads of another phase.

In an alternative embodiment, on the side of the coil heads, the coil heads of the same phase can be grouped into groups of 3 or 4 adjacent electrical conductors. The coil heads of the same phase may not be grouped into groups of less than 3 or 4 adjacent electrical conductors. In particular, the coil heads of the same phase may not be grouped into groups of 2 adjacent electrical conductors only. Two groups of coil heads of the same phase can be separated by at least one group of coil heads of another phase.

In an alternative embodiment, on the side of the coil heads, the coil heads of the same phase may be grouped into groups of 2 or 3 adjacent electrical conductors.

The coil heads of the same phase may not be grouped into groups of less than 2 or 3 adjacent electrical conductors. In particular, the coil heads of the same phase may not be grouped into groups of just 1 electrical conductor only. Two groups of coil heads of the same phase can be separated by at least one group of coil heads of another phase.

The electrical conductors can be arranged in the slots in a distributed manner. "Distributed" means that the outgoing and return electrical conductors are each housed in different and non-consecutive slots. At least one of the electrical conductors can pass successively through two non-consecutive slots.

The electrical conductors can be arranged in a row in the slots. "Row" means that the electrical conductors are not arranged in the slots in bulk, but in an orderly manner. They are stacked in the slots in a non-random manner, for example arranged in a row of electrical conductors aligned in the radial direction.

The electrical conductors may have a generally rectangular cross-section, in particular with rounded edges. The circumferential dimension of an electrical conductor can correspond substantially to the width of a slot. Thus, a slot may comprise only a single electrical conductor in its width. The width of the slot is measured in its circumferential dimension about the axis of rotation of the machine.

Electrical conductors can be adjacent to each other along their long sides, otherwise called the flat.

Optimizing the stack can make it possible to place a greater quantity of electrical conductors in the slots.

Each slot can comprise from 2 to 36 electrical conductors, in particular from 2 to 24, better still from 2 to 12 electrical conductors.

The winding may comprise two conductors per slot. As a variant, the winding could comprise more than two conductors per slot, for example three, four, five, six, seven or eight. Each slot may comprise from two to eight electrical conductors, in particular from two to six electrical conductors, in particular from two to four electrical conductors, for example two or four electrical conductors. In a variant embodiment, each slot comprises two electrical conductors. In another variant embodiment, each slot comprises four electrical conductors.

Insulators

The electrical conductors are electrically insulated from the outside by an insulating coating, in particular an enamel. The electrical conductors can be separated from the walls of the slot by an insulator, in particular by at least one insulating sheet. Such a sheet insulator allows better insulation of the electrical conductors with respect to the stator mass. The use of closed slots can make it possible to improve the retention of the insulators around the electrical conductors in the slots.

Partially Closed or Fully Closed Slots

The slots can be at least partially closed. A partially closed slot makes it possible to provide an opening at the air gap, which can be used, for example, to install the electrical conductors for filling the slot. A partially closed slot is in particular formed between two teeth which each comprise pole shoes at their free end, which close the slot at least in part.

In a variant, the slots can be completely closed. The term "fully closed slot" denotes slots which are not open radially toward the air gap.

In one embodiment, at least one slot, or even each slot, can be continuously closed on the side of the air gap by a material bridge formed in one piece with the teeth defining the slot. All the slots can be closed on the side of the air gap by material bridges closing the slots. The material bridges may have come in one piece with the teeth defining the slot. The stator mass is then devoid of any cutout between the teeth and the material bridges closing the slots, and the slots are then continuously closed on the side of the air gap by the material bridges coming in one piece with the teeth defining the slot.

In addition, the slots can also be closed on the side opposite the air gap by an attached yoke or in one piece with the teeth. The slots are then not radially outwardly open. The stator mass may have no cutout between the teeth and the yoke.

In one embodiment, each of the slots has a continuously closed contour. "Continuously closed" means that the slots have a continuous closed contour when viewed in cross-section, taken perpendicular to the axis of rotation of the machine. It is possible to go all the way around the slot without encountering a cutout in the stator mass.

The presence of the closed slots makes it possible to improve the performance of the electric machine in terms of the quality of the magnetic field in the air gap, by minimizing the harmonic content and the eddy current losses in the electrical conductors, and the leakage fluxes in the slots, as well as the fluctuations of the magnetic field in the air gap and heating of the machine. The closed slots make it possible to have a closed cylindrical air gap, to reduce the leakage fluxes in the slots, which makes it possible to reduce the AC losses in the stator winding. The battery life is therefore extended owing to the increased efficiency of the machine due to the reduction in AC losses.

In addition, the presence of these closed slots makes it possible to improve the mechanical rigidity of the stator, by mechanically strengthening the stator and by reducing vibrations. In particular, it is possible to obtain a separation of the resonance frequencies from the deformation mode corresponding to 2p, p being the number of pairs of stator poles. Reducing the vibrations can help make the operation of the machine quieter, which can be particularly advantageous when the stator is intended to be associated with a gearbox system.

Also, closing the slot can reduce the stray capacitance between the stator windings and the rotor, which reduces leakage currents and can avoid having to use drain rings or brushes for the shaft currents.

The stator mass can be produced by stacking magnetic sheets, the slots being formed by cutting the sheets. The stator mass can also be produced by cutting from a mass of sintered or agglomerated magnetic powder. The closing of the slots on the side of the air gap is obtained by material bridges in one piece with the rest of the sheets or of the block forming the stator mass.

The stator does not have any attached magnetic shims for closing the slots. This eliminates the risk of accidental detachment of these shims.

Material Bridges

The stator mass may comprise teeth formed between the slots, which are interconnected on the side of the air gap by material bridges. Thus, each slot is closed on the side of the air gap by a material bridge interconnecting two consecutive teeth of the stator mass. The material bridges each connect two teeth adjacent to their base on the side of the air gap and define the bottom of the slot between these teeth on the side of the air gap. The material bridges are in one piece with the adjacent teeth.

The two consecutive teeth are connected on the opposite side by a yoke. The yoke can be made in one piece with the teeth. The stator can thus be without a yoke attached to a serrated ring.

As mentioned above, the absence of opening of the slots toward the air gap makes it possible to avoid producing electromagnetic disturbances, in particular an increase in the "magnetic" air gap due to the flux fringes, higher iron losses at the rotor surface for the same reason, or alternatively pulsating torques, as well as radial forces and Joule AC losses. The electromagnetic performance of the machine is improved.

The material bridges can be made so as to be magnetically saturated during machine operation. This limits the passage of the flux from one slot to another without preventing the passage of the flux from the rotor to the stator.

The material bridges are preferably undeformable. This increases the stiffness of the stator and improves the life of the electric machine.

The smallest width of the material bridges is for example between 0.2 and 0.5 mm. It can be of the order of 0.35 mm, for example.

The width of the material bridge can be of the same order of magnitude as the thickness of the sheet.

For example, the stator mass is in the form of stacked sheet metal, having teeth interconnected at their bases on the side of the air gap by material bridges. The material bridges are in one piece with the teeth.

The material bridges can each have at least one localized constriction formed by at least one groove. To obtain saturation, the cross-section of the material bridge which is available for the passage of the flux can be locally reduced, for example by providing a groove. The inner surface of the stator is preferably cylindrical of revolution.

Slots

At least one slot, more preferably all the slots, may be generally rectangular in cross-section.

At least one slot can have opposite radial edges parallel to each other, better still all the slots have radial edges parallel to each other. The width of a slot is preferably substantially constant over its entire height. There is thus a better filling rate of the slots.

In a variant, the radial edges of the slots are not parallel to each other.

At least one slot, better still all the slots, can have a rectilinear bottom, in the form of an arc of a circle or the like. The bottom of the slot is the bottom of the latter located on the side of the yoke, opposite the material bridge and the air gap.

At least one slot, better still all the slots, can have a ratio of the length of the slot to its width of between 2 and 6, better still between 3 and 4. The width of a slot corresponds to its dimension in the circumferential direction measured about the axis of rotation of the machine, and its length to its dimension in the radial direction.

The stator may comprise a sensor for measuring the temperature of the electrical conductors, the sensor being arranged in the slot, for example a thermocouple. This sensor can be housed at least partly in the groove of the material bridge closing the slot. The sensor is for example housed in a space between the conductor closest to the material bridge and the material bridge.

At least one tooth, better still all the teeth, may be generally trapezoidal in cross-section. At least one tooth, better still all the teeth, may have divergent edges moving away from the axis of rotation of the machine.

The stator mass can be produced by stacking sheets. The teeth are connected to each other by material bridges, and on the opposite side by a yoke. The closed slots can be produced entirely by cutting from the sheets. Each sheet of the stack of sheets can be in one piece.

Each sheet is for example cut from a magnetic steel sheet or a sheet containing magnetic steel, for example steel 0.1 to 1.5 mm thick. The sheets can be coated with an electrically insulating varnish on their opposite faces before they are assembled within the stack. Electrical insulation can also be obtained by heat treatment of the sheets, if necessary.

In a variant, the stator mass can be made from a compacted or agglomerated magnetic powder.

Machine and Rotor

In accordance with another aspect, a rotary electric machine, such as a synchronous motor or a synchronous generator, comprises a stator as defined above. The machine can be synchronous or asynchronous. The machine can be a reluctance machine. It can constitute a synchronous motor. It may not be an alternator.

The maximum speed of rotation of the machine can be high, being for example greater than 10,000 rpm, better still greater than 12,000 rpm, being for example of the order of 14,000 rpm to 15,000 rpm, or even 20,000 rpm or 25,000 rpm. The maximum speed of rotation of the machine may be less than 100,000 rpm, or even 60,000 rpm, or even less than 40,000 rpm, better still less than 30,000 rpm.

The rotary electric machine may comprise a rotor. The rotor can be a permanent magnet rotor, with surface or buried magnets. The rotor can be in flux concentration. It can comprise one or more layers of magnets arranged in an I, a U or a V. In a variant, it may be a wound or squirrel cage rotor, or a variable reluctance rotor.

The diameter of the rotor may be less than 400 mm, better still less than 300 mm, and greater than 50 mm, better still greater than 70 mm, for example between 100 and 200 mm.

The rotor may comprise a rotor mass extending along the axis of rotation and arranged around a shaft. The shaft may comprise torque transmission means for driving the rotor mass in rotation.

The rotor may or may not be cantilevered.

The machine can be inserted alone in a housing or inserted in a gearbox housing. In this case, it is inserted in a housing which also houses a gearbox.

Manufacturing Method

A method is also disclosed for manufacturing a stator for a rotary electric machine, in particular a stator as defined above, in which electrical conductors are placed in the slots of a stator mass of the stator by inserting them into the corresponding slots via one or both axial ends of the stator.

At least one electrical conductor, or even a majority of the electrical conductors, introduced into the slots are in the form of a U-pin. They can be shaped prior to their introduction into the slots. All the electrical conductors in the form of a U-pin can be shaped, simultaneously or successively, then introduced into the stator mass simultaneously or successively.

The shaping may comprise a first step of assembling the strands of the same electrical conductor.

The same U-shaped electrical conductor can be placed in two different non-consecutive slots of the stator mass of the stator. In the case where an electrical conductor is U-shaped, it can be soldered to two other electrical conductors on the same side of the machine.

Two I-shaped electrical conductors can be connected together beforehand in two different non-consecutive slots of the stator mass of the stator. In the case where an electrical conductor is I-shaped, it can be soldered to two other electrical conductors on two opposite sides of the machine.

It is possible to electrically connect all the electrical conductors together which have a free end located at the same circumferential position about the axis of rotation of the machine, regardless of their radial position.

BRIEF DESCRIPTION OF THE DRAWINGS

The stator may be better understood on reading the detailed description which follows, of non-limiting embodiments thereof, and on examining the appended drawing, in which.

DETAILED DESCRIPTION

FIGS. 1 to 8 show a stator 2 of a rotary electric machine 1 also comprising a rotor, not shown. The stator makes it possible to generate a rotating magnetic field for driving the rotating rotor, in the context of a synchronous motor, and in the case of an alternator, the rotation of the rotor induces an electromotive force in the electrical conductors of the stator.

The examples illustrated below are schematic and the relative dimensions of the various component elements have not necessarily been observed.

The stator 2 comprises electrical conductors 22, which are arranged in slots 21 formed between teeth 23 of a stator mass 25. The slots 21 are closed.

Figure 4:
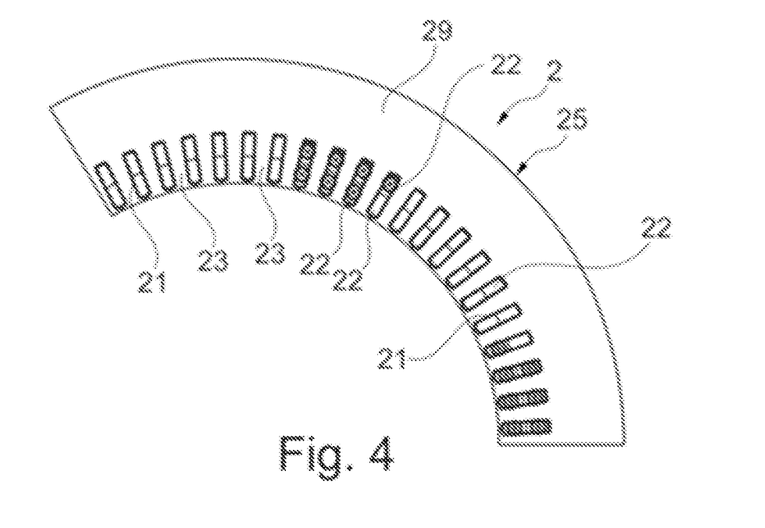
FIG. 4 is a schematic and partial cross-sectional view of the stator according to the invention.

The slots 21 are closed on the side of the air gap by material bridges 27, each connecting two consecutive teeth of the stator mass 25, and on the opposite side by a yoke 29. The latter and the teeth 23 are in one piece.

Figure 1:
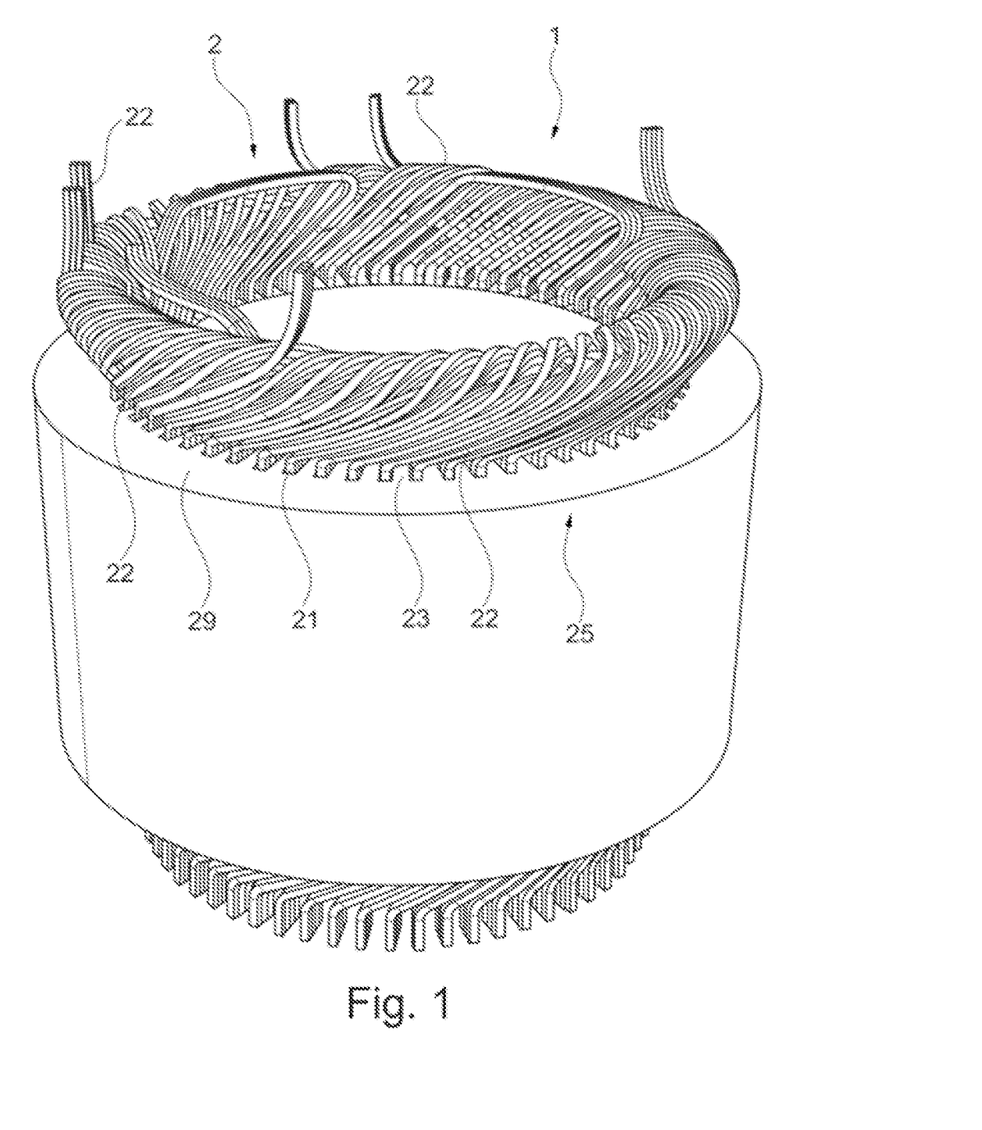
FIG. 1 is a schematic and partial perspective view of a stator.
Figure 2:
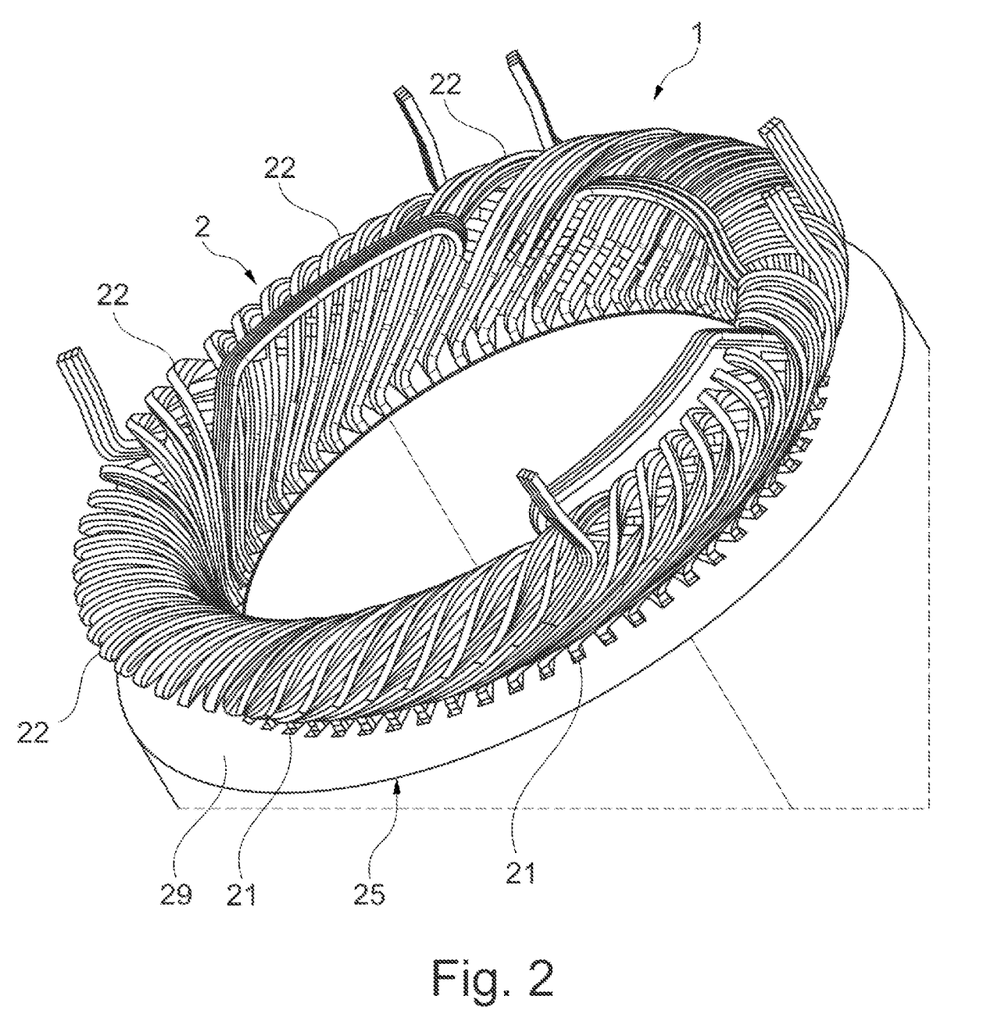
FIG. 2 is a schematic and partial perspective view of the stator of FIG. 1.
Figure 3:
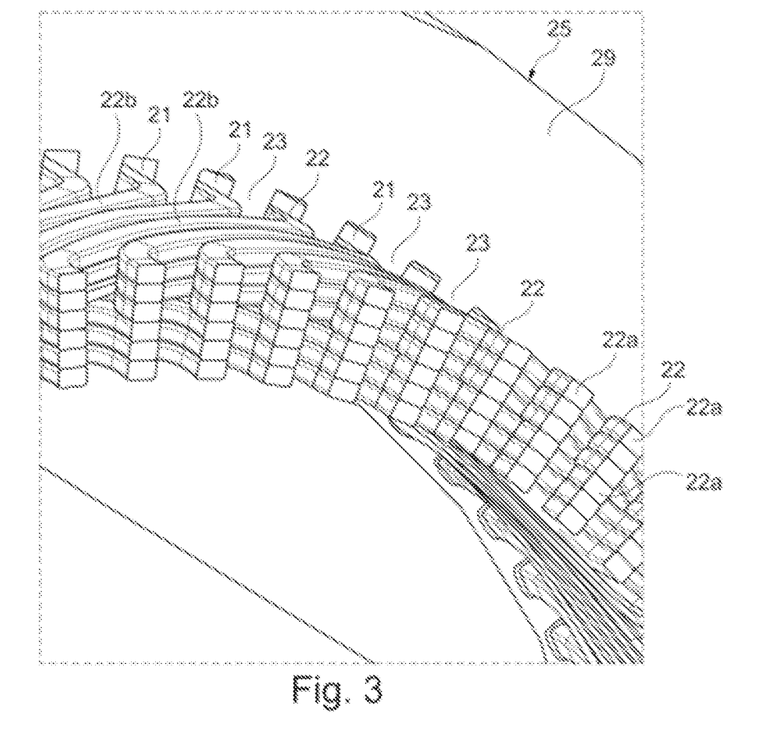
FIG. 3 is a detail perspective view of the stator of FIG. 1.

The electrical conductors 22 are for the most part in the form of pins, namely U- or I-pins, and which extend axially in the slots.

A first electrical conductor housed in a first slot is electrically connected to a second electrical conductor housed in a second slot, at the outlet from said slots.

The first and second slots are non-consecutive. In the illustrated example, they are separated by 7 other slots. In a variant, the first and second slots are separated, for example, by 3, 4, 5, 6, 8, 9, 10 or 11 other slots.

In particular, FIG. 3 shows the end surfaces 22*a* of the first and second electrical conductors intended to receive the electrical connection. The electrical connection is made in a plane perpendicular to the axis of rotation of the machine. The plane of the electrical connection can be less than 40 mm away from the stator mass, in particular approximately 27 mm away.

The electrical connection is formed on the electrical conductors just after they exit the two slots, at one axial end of the stator mass. The two conductors each comprise an oblique portion 22*b*, which converge toward one another.

The electrical conductors are arranged in the slots in a distributed manner, and they form a distributed winding, which is fractional in the described example. In this example, the number of slots is 63. The number of stator poles is 6. Thus, the combination of number of slots/number of stator poles is 63/6.

The electrical conductors form a fractional winding, for which the ratio q defined by q=Ne/(2 pm) is written as an irreducible fraction z/n, z and n being two non-zero integers, n being different from 1, where Ne is the number of slots of the stator, m the number of phases of the winding, and p the number of pairs of stator poles. In particular, FIG. 4 shows a one-phase coil in isolation in the case of a three-phase fractional winding. We then have q=63/(3×6)=7/2 for this machine with 63 slots and 6 poles. A coil is formed by the outgoing electrical conductors of the same phase passing through adjacent slots, and by the return electrical conductors of the same phase passing through adjacent slots.

The electrical conductors 22 are arranged in a row in the slots 21, in a row of aligned electrical conductors.

The electrical conductors may have a generally rectangular cross-section, in particular with rounded corners. In the described example, they are superimposed radially in a single row. The circumferential dimension of an electrical conductor corresponds substantially to the width of a slot. Thus, the slot comprises only one electrical conductor in its width. It can comprise several electrical conductors in its radial dimension. It comprises two in the described example.

The electrical conductors 22 are made of copper or aluminum, or any other conductive material enameled or coated with any other suitable insulating coating.

Figure 5:
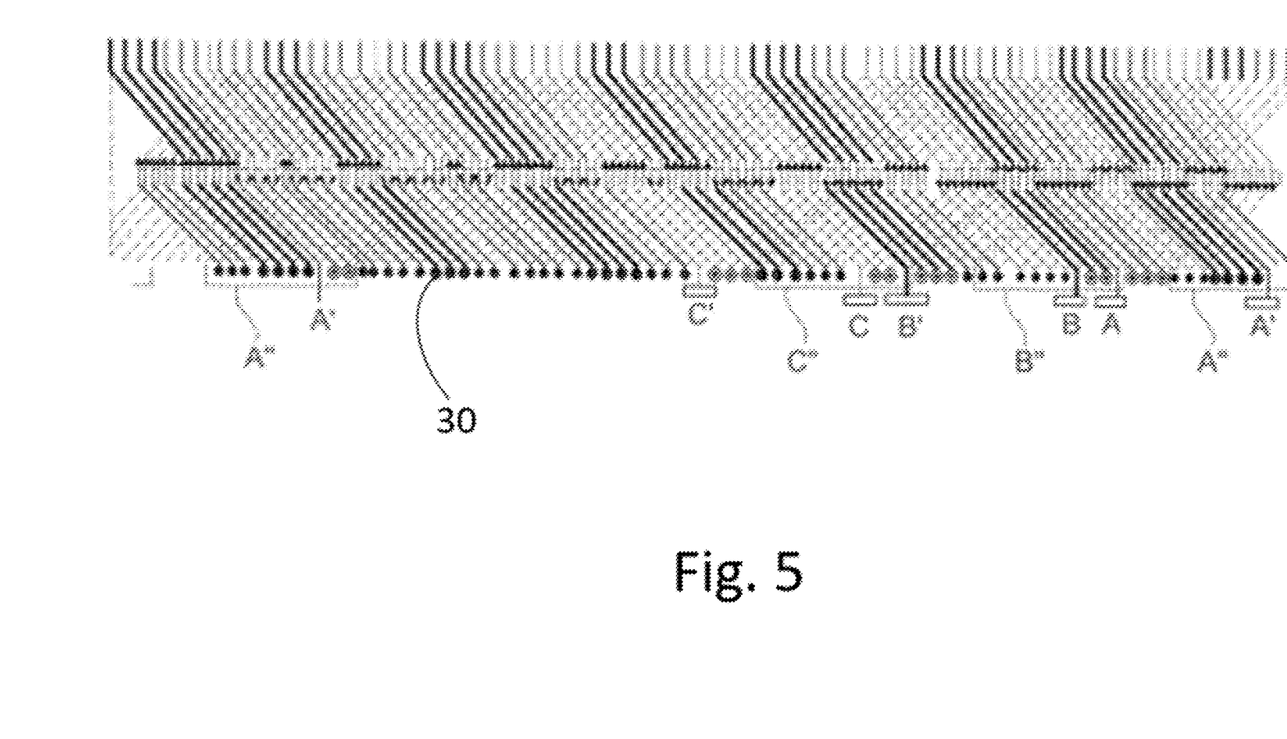
FIG. 5 schematically shows the winding diagram of the stator of FIGS. 1 to 4.
Figure 6:
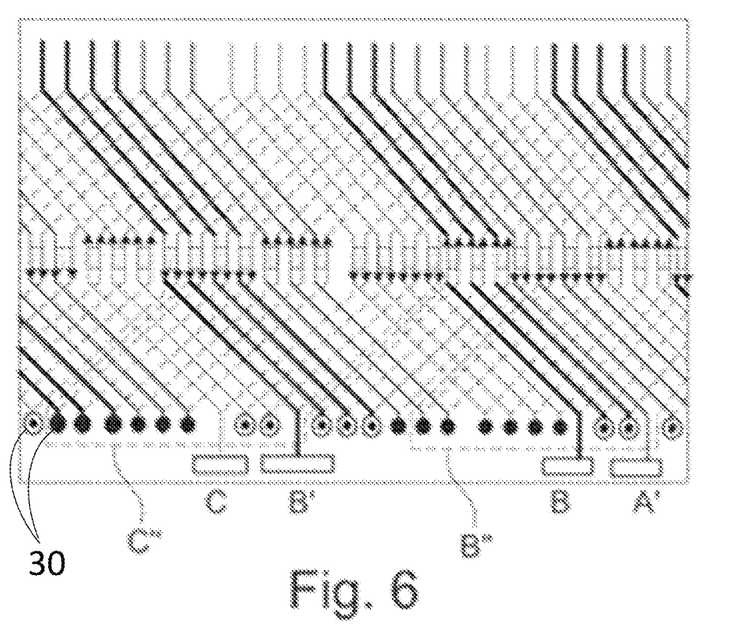
FIG. 6 is a detail view of the winding diagram.
Figure 7:
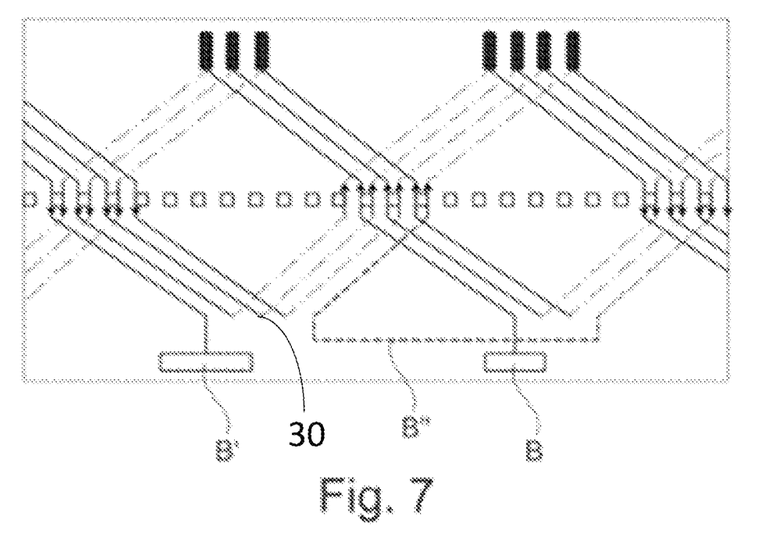
FIG. 7 is another detail view of the winding diagram showing a single phase.

FIGS. 5 to 7 show the pins with oval ends on the side of the welds. The U-pins 30 are shown schematically with circles on the side of the coil heads. The phase inputs and outputs comprise I-pins. In the described example, the inputs and outputs are located on the side of the coil heads. References A, B and C respectively denote the inputs of the phases a, b, c, respectively, and references A', B' and C' respectively denote the outputs of the phases a, b, c, respectively.

Figure 8:
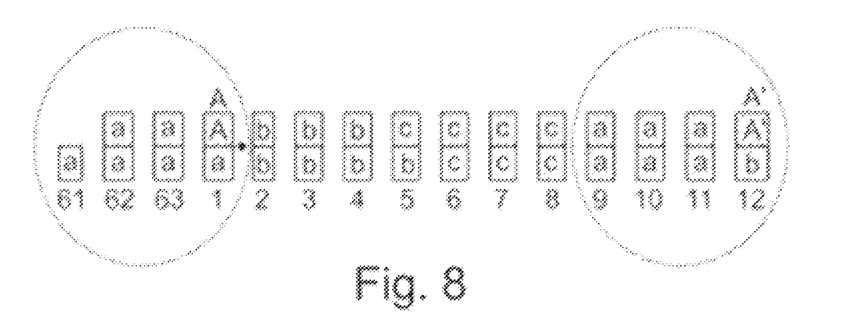
FIG. 8 schematically shows the winding diagram of the stator of FIGS. 1 to 4, in cross-section.

The electrical conductors 22 accommodated in the slots 21 form a multiphase winding having at least a first phase and a second phase. An input electrical conductor A of the first phase a is located in a first slot numbered 1, one or more electrical conductors of the second phase b being located in a second slot numbered 2, as shown in FIG. 8, the second slot 2 immediately following the first slot 1 when moving circumferentially around the axis of rotation of the machine, in the direction of flow of the electric current around the axis of rotation of the machine, that is to say from left to right in FIG. 8. One can see that the input electrical conductor A of the first phase a is located in the first slot 1 just before the second slot 2 receiving one or more electrical conductors of the second phase b, when moving circumferentially around the axis of rotation of the machine, in the direction of flow of the electric current around the axis of rotation of the machine.

Similarly, an output electrical conductor A' of the first phase a is located in a first slot numbered 12 in FIG. 8, one or more electrical conductors of the second phase b being located in a second slot numbered 13, the second slot 13 immediately following the first slot 12 when moving circumferentially around the axis of rotation of the machine, in the direction of flow of the electric current around the axis of rotation of the machine.

The output electrical conductor A' of the first phase a is located in the first slot 12 just before the second slot 13 receiving one or more electrical conductors of the second phase b, when moving circumferentially around the axis of rotation of machine, in the direction of flow of the electric current around the axis of rotation of the machine.

As seen in FIGS. 5 to 7, the length of the return between the input electrical conductor A and the output electrical conductor A' of the same phase a is shortened. These figures also show the belts A", B" and C" of each phase a, b, c, represented horizontally by a dotted line. The belts in this example have a width of 11 slots.

The first input slot numbered 1 of phase a is brought closer to a third output slot numbered 12 of this same phase a. In other words, the number of slots separating the first input slot of a phase and the third output slot of the same phase can be smaller.

The illustrated winding comprises 15 U-pins 30 that are 11 slots wide and 42 U-pins 30 that are 12 slots wide. The U-pins 30 with a width of 12 slots are represented by an empty circle, and the U-pins with a width of 11 slots are represented by a circle with a dot in its center.

Figure 9A:
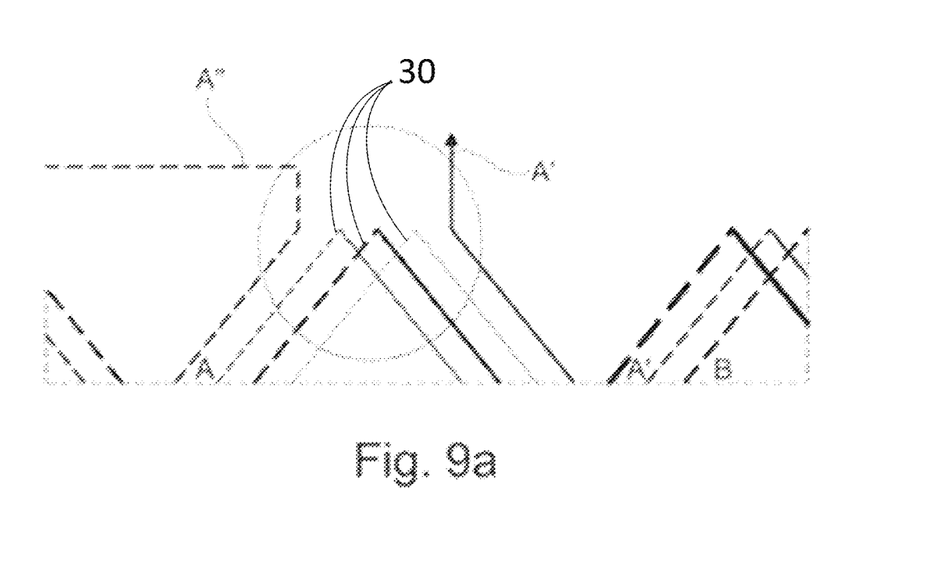
FIG. 9*a* is a detail view of the winding diagram of FIG. 7.

The advantages of the disclosed configuration can be seen in FIG. 9a. The U-pins 30 and the adjacent belt have the same width, which makes it possible to favor their juxtaposition so as to avoid a gap between them. They can thus have the same inclination relative to a plane normal to the longitudinal axis of the machine. The insertion of the electrical conductors is improved, and the stresses internal to the electrical conductors are reduced.

Figure 9B:
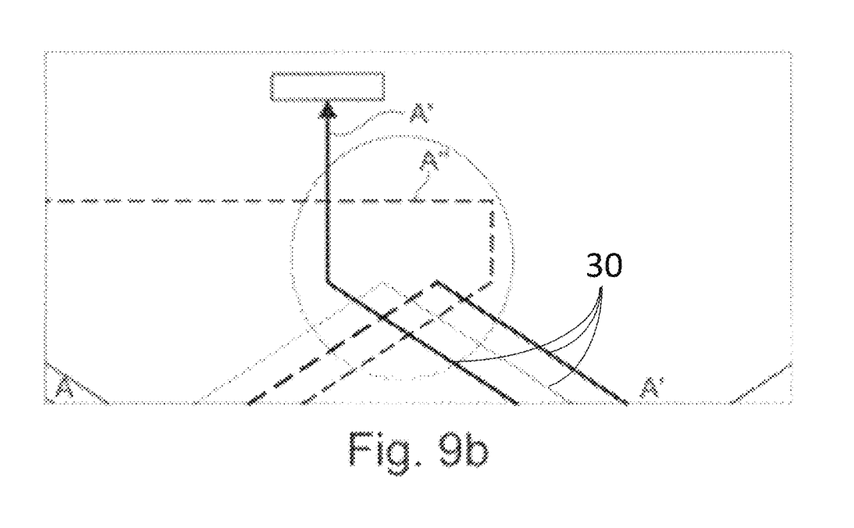
FIG. 9*b* is a view similar to FIG. 9*a* but showing a prior art winding configuration.

On the contrary, for the sake of understanding the advantages of the configuration, FIG. 9b shows a configuration according to the prior art. There is then a stress zone between U-pins 30 with a width of 13 slots relative to a belt with 11 slots. Three variant embodiments have been illustrated in FIGS. 10 to 12.

Figure 10:
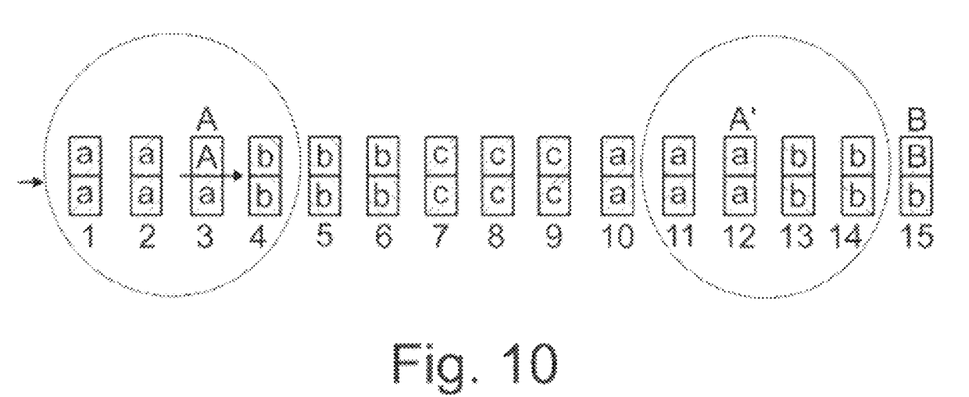
FIG. 10 is a schematic winding diagram similar to FIG. 8 of an alternative embodiment.
Figure 11:
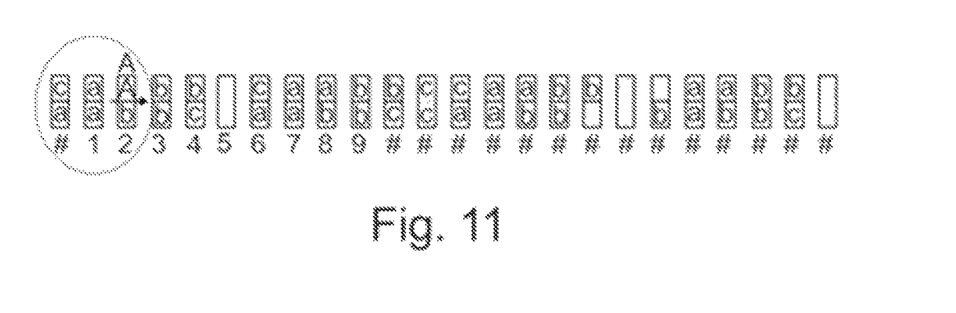
FIG. 11 is a schematic winding diagram similar to FIG. 8 of an alternative embodiment.

In the embodiment of FIG. 10, the winding has 72 slots and 8 poles, and each slot only accommodates electrical conductors of the same phase. The winding comprises 54 U-pins 30 that are 10 slots wide and 12 U-pins that are 9 slots wide. The winding is devoid of U-pins 30 with a width of 11 slots. A slot adjacent to a first slot accommodating input or output electrical conductors or a belt accommodates only U-pins 30 that are 9 or 10 slots wide. In the embodiment of FIG. 11, the winding comprises 48 slots and 8 poles. The winding comprises 36 U-pins 30 that are 8 slots wide and 6 U-pins that are 7 slots wide. The winding is devoid of U-pins 30 with a width of 9 slots. A slot adjacent to a first slot accommodating input or output electrical conductors or a belt accommodates only U-pins 30 that are 7 or 8 slots wide.

Figure 12:
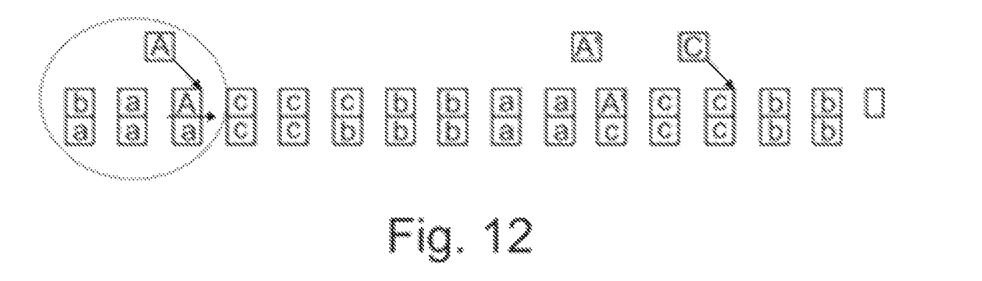
FIG. 12 is a schematic winding diagram similar to FIG. 8 of an alternative embodiment.

Lastly, in the embodiment of FIG. 12, the winding comprises 60 slots and 8 poles. The winding comprises 45 U-pins 30 that are 9 slots wide and 3 U-pins 30 that are 8 slots wide. The winding is devoid of U-pins 30 with a width of 7 slots. A slot adjacent to a first slot accommodating input or output electrical conductors or a belt accommodates only U-pins 30 that are 8 or 9 slots wide.

Figure 13:
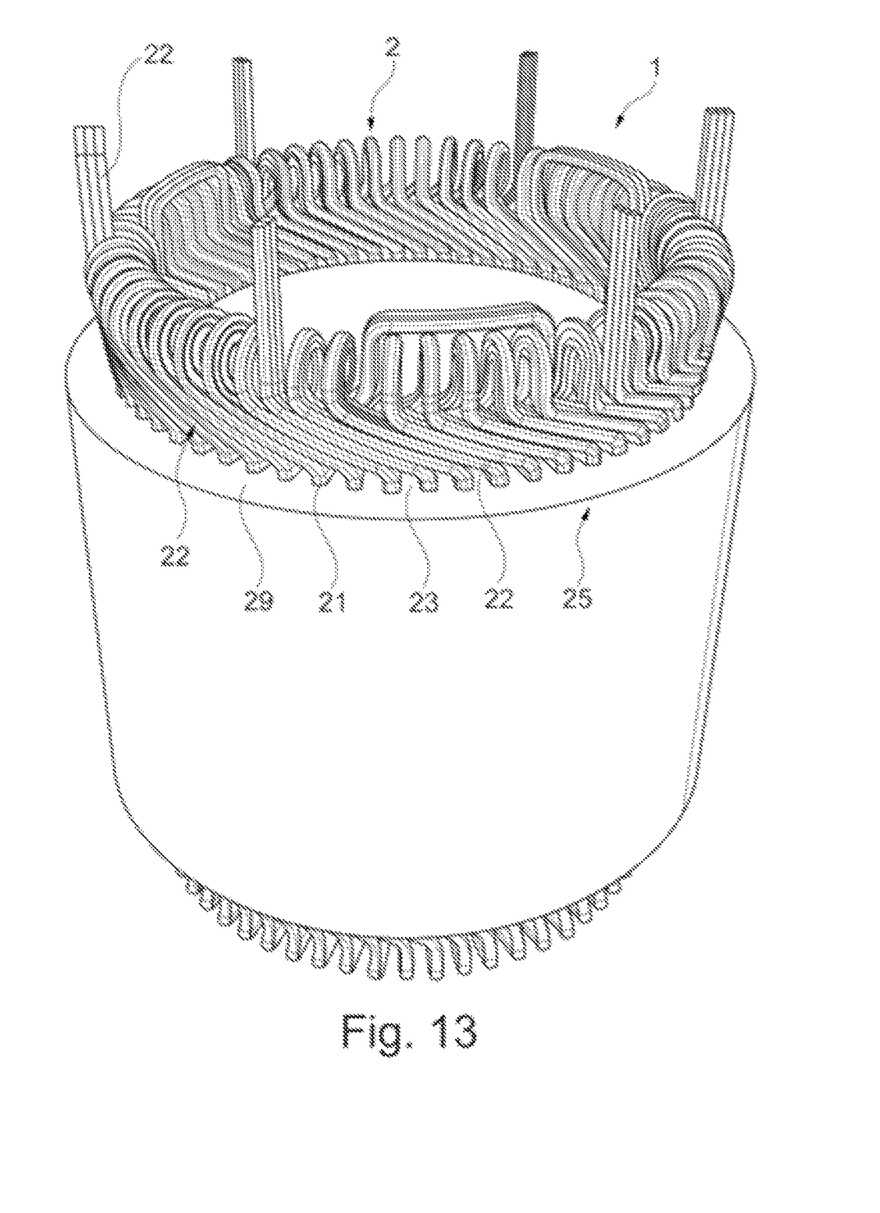
FIG. 13 is a schematic and partial perspective view of the stator of FIG. 12.

FIG. 13 shows the stator of this embodiment. The electrical conductors are arranged in the slots in a distributed manner, and they form a distributed winding, which is fractional in the described example. In this example, the combination of number of slots/number of stator poles is 60/8.

The electrical conductors form a fractional winding, for which the ratio q defined by q=Ne/(2 pm) is written as an irreducible fraction z/n, z and n being two non-zero integers, n being different from 1, where Ne is the number of slots of the stator, m the number of phases of the winding and p the number of pairs of stator poles. We have q=60/(3×8)=5/2 for this machine with 60 slots and 8 poles. A coil is formed by the outgoing electrical conductors of the same phase passing through adjacent slots, and by the return electrical conductors of the same phase passing through adjacent slots. The electrical conductors 22 are arranged in a row in the slots 21, in a row of aligned electrical conductors.

In all the preceding examples, the winding is wavy. The first and second electrical conductors each comprise an oblique portion 22b, which extend in a circumferential direction, about the axis of rotation of the machine, converging toward one another.

The invention claimed is:

1. A stator for a rotary electric machine, comprising a stator mass comprising slots, electrical conductors housed in the slots forming a multiphase winding having at least a first phase (a) and a second phase (b), an input electrical conductor (A) of the first phase (a) being located in a first slot, one or more electrical conductors of the second phase (b) being located in a second slot, the second slot immediately following the first slot when moving circumferentially around the axis of rotation of the machine in the direction of flow of the electric current around the axis of rotation of the machine,
   wherein the winding comprises U-pins with a width of n slots and U-pins with a width of n−1 slots,
   each slot comprising a same number of electrical conductors.

2. The stator according to claim 1, wherein the electrical conductors form a distributed winding.

3. The stator according to claim 1, wherein at least some of the electrical conductors are in the form of U-pins.

4. The stator according to claim 1, wherein at least some of the electrical conductors are in the form of U-pins, with a first of said U-pins being a first width and a second of said U-pins being of a second width.

5. The stator according to claim 4, wherein the winding is devoid of a third U-pin of a third width different from the first and second widths.

6. The stator according to claim 1, wherein the second slot comprises one or more electrical conductors of the same phase only.

7. The stator according to claim 1, wherein the winding is wavy.

8. The stator according claim 1, wherein the winding comprises two conductors per slot.

9. The stator according to claim 1, wherein the winding is of full pitch.

10. The stator according to claim 1, wherein the winding is of shortened pitch.

11. The stator according to claim 1, wherein at least a first electrical conductor housed in the first slot is electrically connected to a second electrical conductor housed in the second slot, at the outlet from said slots.

12. The stator according to claim 1, wherein all the electrical conductors having a free end located at the same circumferential position about the axis of rotation of the machine, regardless of their radial position are electrically connected together.

13. The stator according to claim 1, wherein the electrical conductors form a fractional winding.

14. A rotary electric machine comprising the stator according to claim 1 and a rotor.

* * * * *